United States Patent
Hashimoto et al.

(10) Patent No.: US 7,938,985 B2
(45) Date of Patent: May 10, 2011

(54) ANTICAKING AGENT FOR IRON AND STEEL SLAG

(75) Inventors: Masayuki Hashimoto, Kyoto (JP); Kazunori Nakagawa, Kyoto (JP)

(73) Assignee: Dai-Ichi Kogyo Seiyaku Co., Ltd., Kyoto (JP)

( * ) Notice: Subject to any disclaimer, the term of this patent is extended or adjusted under 35 U.S.C. 154(b) by 61 days.

(21) Appl. No.: 12/313,765

(22) Filed: Nov. 21, 2008

(65) Prior Publication Data

US 2009/0212261 A1 Aug. 27, 2009

(30) Foreign Application Priority Data

Nov. 22, 2007 (JP) .................... 2007-303398

(51) Int. Cl.
  *C09K 13/00* (2006.01)
(52) U.S. Cl. .................................... 252/384
(58) Field of Classification Search .................... 252/384
  See application file for complete search history.

(56) References Cited

U.S. PATENT DOCUMENTS 3,687,858 A * 8/1972 Geisler et al. .................... 134/40
5,413,819 A * 5/1995 Drs ................................ 427/427
2004/0198873 A1 10/2004 Bury et al.
2004/0231567 A1 11/2004 Dulzer et al.
2006/0276364 A1 * 12/2006 Kouvroukoglou et al. ... 510/293

FOREIGN PATENT DOCUMENTS

| JP | 54-96493 | 7/1979 |
| JP | 58-104050 | 6/1983 |
| JP | 59-116156 | 7/1984 |
| JP | 2000-7404 | 1/2000 |
| JP | 2001-58855 | 3/2001 |
| JP | 2002-179442 | 6/2002 |
| JP | 2003-160364 | 6/2003 |
| JP | 2005-82426 | 3/2005 |

* cited by examiner

*Primary Examiner* — Mark Eashoo
*Assistant Examiner* — Peter F Godenschwager
(74) *Attorney, Agent, or Firm* — Jordan and Hamburg LLP

(57) ABSTRACT

An anticaking agent for an iron and steel slag contains (A) at least one member selected from the group consisting of a phosphonic acid derivative and a salt thereof and (B) at least one member selected from the group consisting of an aliphatic hydroxycarboxylic acid and a salt thereof, at a mixing ratio (A)/(B) of the at least one member selected from the group consisting of a phosphonic acid derivative and a salt thereof (A) to the at least one member selected from the group consisting of an aliphatic hydroxycarboxylic acid and a salt thereof (B) of from 95/5 to 5/95 by mass, and the anticaking agent for an iron and steel slag may further contain (C) a sugar alcohol, thereby providing further high synergistic effect on anticaking capability.

1 Claim, No Drawings

ANTICAKING AGENT FOR IRON AND STEEL SLAG

BACKGROUND OF THE INVENTION

1. Field of the Invention

The present invention relates to an anticaking agent for an iron and steel slag, such as granulated blast furnace slag.

2. Background Art

A granulated blast furnace slag is formed by quenching and granulating a blast furnace slag, which is by-produced through a pig iron making process, with pressurized water sprayed thereon, followed by regulating in particle size by pulverization again depending on necessity, and is utilized as an alternate of natural sand as a material for civil engineering and a fine aggregate for concrete.

A granulated blast furnace slag is generally stored in the open air for a prolonged period of time before shipment or before use, and if the slag is stored as it is, the slag is consolidated and cannot be used as an alternate to natural sand. Accordingly, various anticaking agents have been proposed for preventing a granulated blast furnace slag from being consolidated during storage.

For example, JP-A-58-104050 discloses an anticaking agent containing as a major component a saccharide or a sugar alcohol, which is a reduced derivative of a saccharide, and JP-A-59-116156 discloses one containing sorbitol as a major component. JP-A-2001-58855 discloses one containing an alkylene oxide adduct of an aliphatic hydroxycarboxylic acid and/or a salt thereof, and JP-A-2002-179442 discloses one containing an aqueous solution of at least one of a carbonate, a hydrogen carbonate, ammonium carbonate and ammonium hydrogencarbonate. JP-A-54-96493 discloses an agent for producing a granulated blast furnace slag containing a polymer or a copolymer that contains as an essential constitutional component a water-soluble monoethylenic unsaturated monomer (such as sodium acrylate), and also discloses that the use of the agent provides anticaking effect on storage. JP-A-2003-160364 discloses a anticaking agent containing an acrylic acid based polymer. JP-A-2005-82426 discloses a anticaking agent containing a phosphonic acid derivative as an essential component, and further containing a polycarboxylic acid or a salt thereof and/or a sugar alcohol in suitable amounts.

However, the aforementioned anticaking agents having been developed provide a certain extent of anticaking effect but are still unsatisfactory, and in particular, they are insufficient in anticaking on long-term storage.

Among the anticaking agents, a phosphonic acid derivative or a salt thereof exhibits excellent anticaking effect, but the sole use thereof may bring about such problems as in cost, operation safety due to low pH thereof, corrosion of a storing container, a metallic piping and the like, and stability of a product thereof. The problems can be resolved by adding a polycarboxylic acid or a salt thereof and/or a sugar alcohol to a phosphonic acid derivative or a salt thereof to provide an anticaking agent with high performance, but there is still room for further improvement in anticaking with a small amount of an agent and maintenance of anticaking effect for a prolonged period of time.

A slag treated with an agent is often allowed to stand in the open air, and it is necessary to prevent the agent from being washed away from the surface of the slag by rain. Furthermore, there are increasing demands including reduction in cost on an anticaking agent, and further improvements thereof are expected.

SUMMARY OF THE INVENTION

The invention has been developed under the circumstances, and an object thereof is to provide an anticaking agent for a granulated blast furnace slag that exhibits excellent anticaking effect for a prolonged period of time even under a severe environment, such as rainfall. Another object of the invention is to provide an agent that exhibits the similar anticaking effect to pulverized products of an air-cooled blast furnace slag, a steel slag and the like, in addition to a granulated blast furnace slag.

As a result of earnest investigations made by the inventors for solving the problems, it has been found that an anticaking agent for an iron and steel slag, such as a granulated blast furnace slag and the like, containing a phosphonic acid derivative or a salt thereof and an aliphatic hydroxycarboxylic acid or a salt thereof as essential components with a sugar alcohol added thereto exhibits a further effective capability owing to the synergistic effect of the two or three components, as compared to the sole use of a phosphonic acid derivative or a salt thereof.

The invention relates to, as an aspect, an anticaking agent for an iron and steel slag, containing (A) at least one member selected from the group consisting of a phosphonic acid derivative and a salt thereof and (B) at least one member selected from the group consisting of an aliphatic hydroxycarboxylic acid and a salt thereof, at a mixing ratio (A)/(B) of the at least one member selected from the group consisting of a phosphonic acid derivative and a salt thereof (A) to the at least one member selected from the group consisting of an aliphatic hydroxycarboxylic acid and a salt thereof (B) of from 95/5 to 5/95 by mass.

The anticaking agent for an iron and steel slag of the invention may further contain (C) a sugar alcohol, at a mixing ratio (A)/((B)+(C)) of the at least one member selected from the group consisting of a phosphonic acid derivative and a salt thereof (A) to a total amount of the at least one member selected from the group consisting of an aliphatic hydroxycarboxylic acid and a salt thereof (B) and the sugar alcohol (C) of from 95/5 to 5/95 by mass, thereby providing further high synergistic effect on anticaking capability.

According to the anticaking agent for an iron and steel slag of the invention, excellent anticaking effect can be obtained for a prolonged period of time under a severe environment, whereby a granulated blast furnace slag used as an alternate to natural sand can be safely stored for a prolonged period of time, and the using amount and the number of times of use of the agent can be reduced. The anticaking agent of the invention exhibits an effective anticaking capability not only to a granulated blast furnace slag, but also to pulverized products of an air-cooled blast furnace slag, a steel slag and the like.

DESCRIPTION OF EMBODIMENTS OF THE INVENTION

The anticaking agent for an iron and steel slag of the invention will be described in detail with reference to embodiments below.

The phosphonic acid derivative used in the invention is not particularly limited as far as it is ordinarily used as a phosphonic acid sequestering agent.

Preferred examples of the phosphonic acid derivative include 1-hydroxyethylene-1,1-diphosphonic acid represented by the formula (1), nitrilotris(methylenephosphonic acid) represented by the formula (2), phosphonobutanetricarboxylic acid represented by the formula (3), an alkylenediaminetetra(methylenephosphonic acid) represented by the general formula (4) (such as ethylenediaminetetra(methylenephosphonic acid) represented by the general formula (4), wherein n is 2, and hexamethylenediaminetetra(methylenephosphonic acid) represented by the general formula (4), wherein n is 6), a dialkylenetriaminepenta(methylenephosphonic acid) represented by the general formula (5) (such as diethylenetriaminepenta(methylenephosphonic acid) represented by the general formula (5), wherein n is 2), and salts thereof.

Examples of the salt of the phosphonic acid derivative include an alkali metal salt, an alkaline earth metal salt and an ammonium salt thereof, and an alkali metal salt, such as a sodium salt and a potassium salt, is preferred.

The phosphonic acid derivative or a salt thereof may be used solely or as a mixture of two or more kinds thereof.

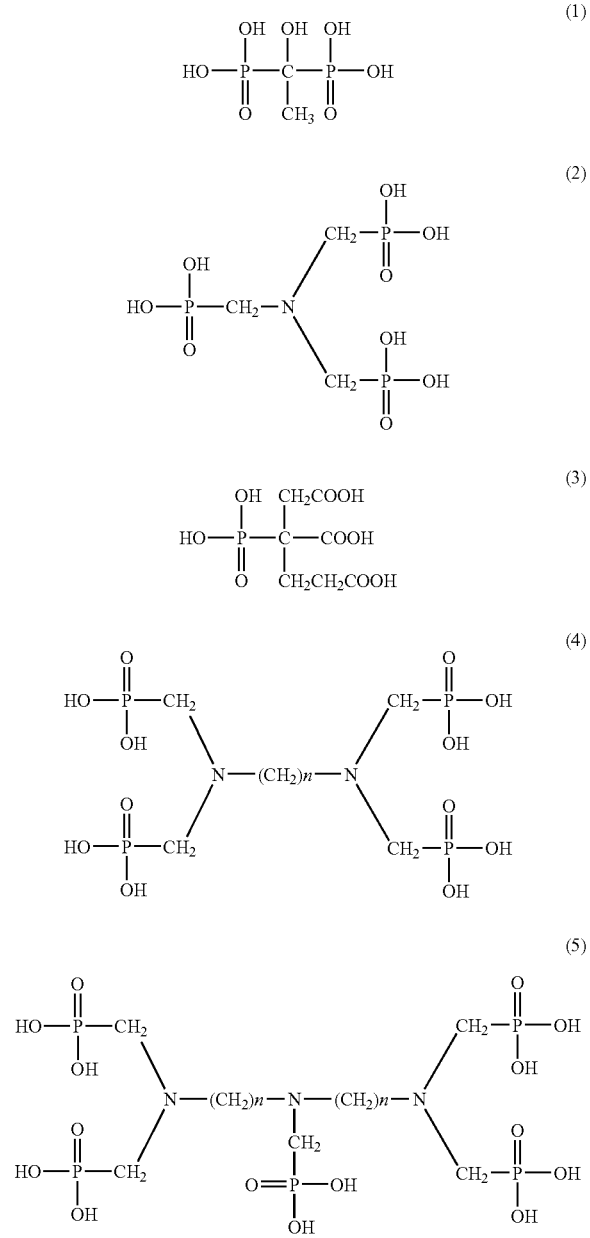

In the formulas (4) and (5), n represents an integer of from 1 to 8.

In the formulas (4) and (5), n represents an integer of from 1 to 8.

The aliphatic hydroxycarboxylic acid or a salt thereof used in the invention is not particularly limited as far as it is a compound having a carboxyl group and a hydroxyl group in the molecule thereof or a salt thereof, and examples thereof include gluconic acid, glucoheptonic acid, citric acid, tartaric acid and salts thereof.

Examples of the salt of the aliphatic hydroxycarboxylic acid include an alkali metal salt, such as a sodium salt and a potassium salt, an alkaline earth metal salt, such as a calcium salt, and an ammonium salt thereof. Among these, sodium gluconate is preferably used, and the use thereof with the phosphonic acid derivative or a salt thereof in combination exhibits a further enhanced anticaking capability.

The aliphatic hydroxycarboxylic acid or a salt thereof may be used solely or as a mixture of two or more kinds thereof.

Preferred examples of the sugar alcohol include those having 4 or more carbon atoms, such as erythritol, arabitol, sorbitol, mannitol and dulcitol, which may be used solely or as a mixture of two or more kinds thereof.

Among these, sorbitol is preferably used as the sugar alcohol, and the use thereof with the phosphonic acid derivative or a salt thereof and the aliphatic hydroxycarboxylic acid or a salt thereof in combination exhibits a further enhanced anticaking capability.

In the anticaking agent of the invention, the mixing ratio (A)/(B) of the phosphonic acid derivative or a salt thereof (A) to the aliphatic hydroxycarboxylic acid or a salt thereof (B) is from 95/5 to 5/95 by mass, preferably from 90/10 to 10/90 by mass, and further preferably from 50/50 to 20/80 by mass. In the case where the mixing ratio (A)/(B) is outside the range of from 95/5 to 5/95, the anticaking agent is insufficient in anticaking effect for a prolonged period of time.

In the anticaking agent of the invention, when the sugar alcohol (C) is mixed with the phosphonic acid derivative or a salt thereof (A) and the aliphatic hydroxycarboxylic acid or a salt thereof (B), the mixing ratio (A)/((B)+(C)) is from 95/5 to 5/95. In consideration of the synergistic effect of the use of the aliphatic hydroxycarboxylic acid or a salt thereof (B) and the sugar alcohol (C), the mixing ratio (A)/((B)+(C)) is preferably from 90/10 to 10/90, and in consideration of the cost in view of the expensiveness of the phosphonic acid derivative, the mixing ratio (A)/((B)+(C)) is further preferably from 50/50 to 20/80. In the case where the mixing ratio (A)/((B)+(C)) is outside the range of from 95/5 to 5/95, the anticaking agent is insufficient in anticaking effect for a prolonged period of time under a severe environment, such as rainfall.

The anticaking agent of the invention is prepared generally by dissolving the aforementioned components in water. The resulting aqueous solution is not particularly limited in concentration and is generally prepared to have a solid concentration of from 10 to 60% by mass. Upon use, it is preferred that the aqueous solution is appropriately diluted to make a solution having a solid concentration of from 1 to 20% by mass, which is applied to an iron and steel slag. The anticaking agent may further contain, in addition to the aforementioned components, an additive, such as an antiseptic, in a range that does not impair the advantages of the invention.

A method for treating an iron and steel slag with the anticaking agent of the invention is not particularly limited. Examples of the method include a method of spraying an aqueous solution of the anticaking agent to an iron and steel slag, a method of kneading an aqueous solution of the anticaking agent with an iron and steel slag, and a method of impregnating an iron and steel slag with an aqueous solution of the anticaking agent.

The anticaking agent of the invention may be added to pressurized water, which is used on granulation for producing a granulated blast furnace slag, to exhibit the anticaking effect thereof. Specifically, a granulated blast furnace slag is produced in such a manner that a liquid slag is primarily pulverized with pressurized water, and is then dropped into an agitation bath or a water bath in a pit, at which the slag is secondarily pulverized and solidified by cooling. The pressurized water is generally reused by circulating, and the anticaking agent may be added to the pressurized water to apply the anticaking agent to the slag, thereby preventing the slag from caking on storing in a later stage.

The amount of the anticaking agent applied to an iron and steel slag is preferably from 0.001 to 0.5% by mass, and more preferably from 0.01 to 0.1% by mass in terms of dry content, based on the dry mass of the iron and steel slag. In the case where the amount of the anticaking agent used is in the range, the anticaking effect can be stably exhibited for a prolonged period of time, and upon using the granulated blast furnace slag as an aggregate for concrete, the strength of the resulting concrete cured structure can be prevented from being adversely affected thereby.

According to the invention, a phosphonic acid derivative or a salt thereof is applied to an iron and steel slag, such as a granulated blast furnace slag, along with an aliphatic hydroxycarboxylic acid or a salt thereof and/or a sugar alcohol, thereby exhibiting an excellent anticaking capability for a prolonged period of time, and the mechanism thereof is considered as follows. A slag is consolidated in such a mechanism that CaO, $Al_2O_3$, MgO and the like having formed solid solutions are eluted to increase pH of the slag, whereby the chain bonds of $SiO_2$ and $Al_2O_3$ in the slag are dissociated to form calcium silicate hydrate (C-S-H gel) and calcium aluminate hydrate (C-A-H gel), which bring about caking. It is considered that the addition of the anticaking agent of the invention prevents pH of the slag from being increased, thereby suppressing the slag from caking.

EXAMPLES

The invention will be described in more detail with reference to examples below, but the invention is not construed as being limited thereto.

Example 1

Aqueous solutions (solid concentration: 20% by mass) of anticaking agents of Examples and Comparative Examples were prepared according to the formulations shown in Table 1 below. Examples 1 to 3, 7 and 9 are examples using a phosphonic acid derivative and sodium gluconate in combination, and Examples 4 to 6, 8 and 10 are examples using a phosphonic acid derivative, sodium gluconate and sorbitol in combination. Comparative Example 1 is an example using no anticaking agent, Comparative Examples 2 to 4 are examples using a phosphonic acid derivative solely, Comparative Example 5 is an example using a phosphonic acid derivative and sorbitol in combination, Comparative Example 6 is an example using sodium gluconate solely, Comparative Example 7 is an example using sorbitol solely, and Comparative Example 8 is an example using sodium gluconate and sorbitol in combination.

In Table 1, "HEDP" is a phosphonic acid derivative "Chelest PH212", a trade name, produced by Chelest Corporation, as an example of a commercially available product, which is a disodium salt of 1-hydroxyethylene-1,1-diphosphonic acid represented by the formula (1).

"NTMP" is a phosphonic acid derivative "Chelest PH320", a trade name, produced by Chelest Corporation, as an example of a commercially available product, which is nitrilotris(methylenephosphonic acid) represented by the formula (2).

"PBTC" is a phosphonic acid derivative "Chelest PH430", a trade name, produced by Chelest Corporation, as an example of a commercially available product, which is phosphonobutanetricarboxylic acid represented by the formula (3).

As sodium gluconate (Na gluconate), "GLUCONA", a trade name, produced by BASF AG was used. As sorbitol, "Sorbit", a trade name, produced by Towa-Kasei Co., Ltd. was used.

A granulated blast furnace slag having been controlled in particle size to 5 mm or less (coarse particle ratio: 2.68) was placed in a mixing tank, and agitated with a hand shovel under application of each of aqueous solutions of the anticaking agents by spraying thereon in an addition amount of the anticaking agent of 0.01% by mass in terms of dry content thereof based on the dry mass of the slag, adjusting the water content of the slag to 10% by mass, and the mixture was then slowly mixed with a mortar mixer for 5 minutes. The coarse particle ratio of the slag was calculated according to JIS A1102, Test Method for sieving Aggregate, by the expression, (coarse particle ratio)=(total percentage by mass of samples remaining on the sieves)/100.

240 g of the treated slag was charged in a summit mold having a diameter of 50 mm and a height of 100 mm and applied with a load of 0.1 $N/mm^2$ with a universal strength tester (produced by Marui & Co., Ltd.), and after removing the load, the slag was sealed airtightly and stored in a thermostat chamber at 50° C. Samples after lapsing 10 days, 30 days, 50 days, 70 days and 90 days from the start of storing were each sieved with a 5-mm sieve, and the slag not having passed therethrough and remained on the sieve was measured for mass, which was designated as a caking degree. The results obtained are shown in Table 1.

Example 2

The slag measured for caking degree after lapsing 50 days among the slags evaluated in Example 1 was placed on a 300-μm sieve and showered with water for 10 minutes for evaluating influence of rain on an agent-treated slag allowed to stand in the open air. After the showering, the slag was dried in a thermostat chamber at 50° C. for regulating water content, and water was added thereto depending on necessity to adjust the water content to 10% by mass. According to the similar manner as in Example 1, 200 g of the slag thus processed was charged in the summit mold and applied with the load, and after removing the load, the slag was sealed airtightly and stored in a thermostat chamber at 50° C. Samples after lapsing 10 days, 30 days, 50 days, 70 days and 90 days from the start of storing were each sieved with a 5-mm sieve, and the slag not having passed therethrough and remaining on the sieve was measured for mass, which was designated as a caking degree. The results obtained are shown in Table 2.

TABLE 1

| | No. | Formulation of anticaking agent (part by mass) | Caking degree (%) | | | | |
|---|---|---|---|---|---|---|---|
| | | | After 10 days | After 30 days | After 50 days | After 70 days | After 90 days |
| Example | 1 | phosphonic acid derivative (HEDP)/Na gluconate (20/80) | 0.8 | 1.3 | 1.9 | 4.2 | 5.5 |
| | 2 | HEDP/Na gluconate (40/60) | 0.7 | 1.0 | 1.5 | 2.1 | 3.2 |
| | 3 | HEDP/Na gluconate (80/20) | 0.7 | 1.2 | 1.4 | 1.8 | 1.8 |
| | 4 | HEDP/Na gluconate/sorbitol (20/40/40) | 0.5 | 0.6 | 0.6 | 1.1 | 1.5 |
| | 5 | HEDP/Na gluconate/sorbitol (40/30/30) | 0.3 | 0.4 | 0.8 | 1.0 | 1.1 |
| | 6 | HEDP/Na gluconate/sorbitol (80/10/10) | 0.4 | 0.4 | 0.5 | 0.8 | 1.3 |
| | 7 | phosphonic acid derivative (NTMP)/Na gluconate (30/70) | 0.5 | 0.9 | 1.1 | 1.4 | 1.9 |
| | 8 | NTMP/Na gluconate/sorbitol (30/35/35) | 0.5 | 0.7 | 0.7 | 0.7 | 1.2 |
| | 9 | phosphonic acid derivative (PBTC)/Na gluconate (30/70) | 0.3 | 0.8 | 0.9 | 1.2 | 1.3 |
| | 10 | PBTC/Na gluconate/sorbitol (30/35/35) | 0.3 | 0.8 | 0.9 | 1.1 | 1.2 |
| Comparative Example | 1 | not added | 40.3 | 100.0 | 100.0 | 100.0 | 100.0 |
| | 2 | HEDP (100) | 0.9 | 1.2 | 2.5 | 5.8 | 9.6 |
| | 3 | NTMP (100) | 0.5 | 0.9 | 1.5 | 4.5 | 8.7 |
| | 4 | PBTC (100) | 0.8 | 1.2 | 1.4 | 5.2 | 8.3 |
| | 5 | HEDP/sorbitol (40/60) | 0.5 | 1.4 | 3.8 | 5.5 | 7.2 |
| | 6 | Na gluconate (100) | 10.5 | 68.9 | 80.2 | 92.1 | 100.0 |
| | 7 | sorbitol (100) | 20.4 | 70.2 | 85.9 | 100.0 | 100.0 |
| | 8 | Na gluconate/sorbitol (70/30) | 13.2 | 50.5 | 70.3 | 88.9 | 100.0 |

TABLE 2

| | No. | Formulation of anticaking agent (part by mass) | Caking degree (%) | | | | |
|---|---|---|---|---|---|---|---|
| | | | After 10 days | After 30 days | After 50 days | After 70 days | After 90 days |
| Example | 1 | phosphonic acid derivative (HEDP)/Na gluconate (20/80) | 6.1 | 7.9 | 12.1 | 15.9 | 16.6 |
| | 2 | HEDP/Na gluconate (40/60) | 8.1 | 8.9 | 10.2 | 11.1 | 13.2 |
| | 3 | HEDP/Na gluconate (80/20) | 7.3 | 8.5 | 9.9 | 11.4 | 14.5 |
| | 4 | HEDP/Na gluconate/sorbitol (20/40/40) | 5.5 | 6.9 | 8.2 | 8.9 | 10.1 |
| | 5 | HEDP/Na gluconate/sorbitol (40/30/30) | 4.2 | 8.9 | 8.9 | 10.2 | 11.8 |
| | 6 | HEDP/Na gluconate/sorbitol (80/10/10) | 3.4 | 6.2 | 10.3 | 13.4 | 14.4 |
| | 7 | phosphonic acid derivative (NTMP)/Na gluconate (30/70) | 3.5 | 5.3 | 5.8 | 8.8 | 10.2 |
| | 8 | NTMP/Na gluconate/sorbitol (30/35/35) | 2.2 | 4.3 | 5.0 | 9.6 | 12.3 |
| | 9 | phosphonic acid derivative (PBTC)/Na gluconate (30/70) | 1.8 | 3.2 | 4.3 | 6.6 | 8.2 |
| | 10 | PBTC/Na gluconate/sorbitol (30/35/35) | 2.0 | 2.4 | 3.7 | 8.2 | 12.1 |
| Comparative Example | 1 | not added | 35.2 | 78.3 | 96.3 | 100.0 | 100.0 |
| | 2 | HEDP (100) | 10.3 | 16.4 | 24.5 | 25.7 | 31.2 |
| | 3 | NTMP (100) | 6.3 | 8.9 | 18.5 | 20.1 | 22.3 |
| | 4 | PBTC (100) | 5.5 | 10.1 | 19.2 | 22.5 | 25.1 |
| | 5 | HEDP/sorbitol (40/60) | 8.9 | 13.3 | 20.2 | 23.4 | 28.2 |
| | 6 | Na gluconate (100) | 24.9 | 58.7 | 90.2 | 95.4 | 100.0 |
| | 7 | sorbitol (100) | 30.2 | 65.8 | 88.2 | 97.2 | 100.0 |
| | 8 | Na gluconate/sorbitol (70/30) | 22.4 | 70.2 | 80.8 | 94.1 | 100.0 |

AS shown in Table 1, the anticaking agents of the examples using a phosphonic acid derivative and an aliphatic hydroxycarboxylic acid or a salt thereof and/or a sugar alcohol in combination exhibited superior results in anticaking effect on long-term storage, as compared to the anticaking agents of the comparative examples. The sole use of a phosphonic acid derivative in Comparative Examples 2 to 4 showed good anticaking effect, but as being apparent from Examples 1 to 10, the combination use of a phosphonic acid derivative with an aliphatic hydroxycarboxylic acid or a salt thereof and/or a sugar alcohol exhibited superior anticaking effect for a prolonged period of time, and showed reduction in cost on use, improvement in stability of the agent due to change in pH of the agent, and the like, owing to the synergistic effect thereof, as compared to the sole use of a phosphonic acid derivative.

As shown in Table 2, in the case where the anticaking agent is showered with water, the examples showed a tendency that caking is hard to occur, as compared to the comparative examples including the case using no anticaking agent. The results suggested that the agent adsorbed on the slag was not washed out by showering with water but maintains the effective capability, and accordingly, the issue in the art that, upon storing a slag treated with a anticaking agent in the open air, the agent is washed away from the surface of the slag by rain to fail to exhibit the capability, can be resolved by practicing the invention.

The anticaking agent for an iron and steel slag of the invention exhibits anticaking effect for a granulated blast furnace slag, an air-cooled blast furnace slag, a steel making slag and the like upon storing, transporting and the like, and a slag treated with the agent can be utilized without any problem as an alternate of natural sand as a material for civil engineering and a fine aggregate for concrete.

What is claimed is:
1. An anticaking agent for an iron and steel slag that, when applied to slag, prevents slag consolidation and maintains the industrial usefulness of the slag over time, the anticaking agent comprising (A) at least one member selected from the group consisting of 1-hydroxyethylene-1,1-diphosphonic acid, nitrilotris(methylenephosphonic acid), phosphonobutanetricarboxylic acid and a salt thereof, (B) sodium gluconate, and (C) sorbitol; the anticaking agent having a mixing ratio (A)/(B)/(C) of from 20%≦(A)≦80%/10%≦(B)≦40%/10%≦(C)≦40%, by mass, with the proviso that (A)+(B)+(C)=100%.

* * * * *